US010284505B2

(12) United States Patent
Grant et al.

(10) Patent No.: US 10,284,505 B2
(45) Date of Patent: *May 7, 2019

(54) SOCIAL MEDIA INTERACTION AGGREGATION FOR DUPLICATE IMAGE POSTS

(71) Applicant: International Business Machines Corporation, Armonk, NY (US)

(72) Inventors: Robert H. Grant, Austin, TX (US); Jeremy A. Greenberger, Raleigh, NC (US); Trudy L. Hewitt, Cary, NC (US); Jana H. Jenkins, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,504

(22) Filed: May 3, 2017

(65) Prior Publication Data

US 2018/0324125 A1 Nov. 8, 2018

(51) Int. Cl.
*H04L 12/58* (2006.01)
*H04L 29/08* (2006.01)

(52) U.S. Cl.
CPC .............. *H04L 51/12* (2013.01); *H04L 51/24* (2013.01); *H04L 51/32* (2013.01); *H04L 67/306* (2013.01)

(58) Field of Classification Search
CPC ....... H04L 51/12; H04L 67/306; H04L 51/32; H04L 51/24; H04L 51/10; G06F 3/0482; G06F 17/30117; G06F 17/30256; H04N 2201/0087; H04N 1/00177; H04N 1/00188; G06Q 50/01; G11B 27/022
See application file for complete search history.

(56) References Cited

U.S. PATENT DOCUMENTS

| 8,660,998 | B2 | 2/2014 | Kato |
| 8,774,561 | B2 | 7/2014 | Martin et al. |
| 8,861,804 | B1* | 10/2014 | Johnson ............. G06K 9/00221 382/118 |
| 9,122,912 | B1 | 9/2015 | Briskin et al. |
| 9,384,418 | B1 | 7/2016 | Cantley et al. |
| 2006/0031324 | A1* | 2/2006 | Chen .................... G06Q 10/107 709/206 |

(Continued)

OTHER PUBLICATIONS

List of IBM Patents or Patent Applications Treated as Related.

*Primary Examiner* — Sargon N Nano
(74) *Attorney, Agent, or Firm* — Scully, Scott, Murphy & Presser, P.C.; Michael P. O'Keefe, Esq.

(57) ABSTRACT

A social media platform is searched by a computer to identify a set of duplicate images including a first image that was posted to the platform by a first user and a second image that was posted to the platform by a second user. A notification is provided by the computer to the first user and the second user indicating that the set of duplicate images exists. A host is selected by the computer for a single consolidated image of the set of duplicate images. The first image or the second image is used by the computer to provide the single consolidated image. One or more social media interactions associated with the first image are consolidated by the computer with one or more social media interactions associated with the second image to generate a single set of social media interactions for the single consolidated image.

11 Claims, 5 Drawing Sheets

(56) References Cited

U.S. PATENT DOCUMENTS

| | | | |
|---|---|---|---|
| 2010/0114985 A1* | 5/2010 | Chaudhary | G06F 17/3002 707/803 |
| 2012/0051668 A1* | 3/2012 | Martin | G11B 27/022 382/305 |
| 2013/0129258 A1 | 5/2013 | Conrad | |
| 2014/0270530 A1 | 9/2014 | Dwan et al. | |
| 2015/0310059 A1* | 10/2015 | Assam | G06F 17/30386 707/748 |
| 2016/0261669 A1* | 9/2016 | Elliott | G06Q 10/101 |
| 2017/0214752 A1* | 7/2017 | Longo | H04L 67/18 |

* cited by examiner

SOCIAL MEDIA INTERACTION AGGREGATION FOR DUPLICATE IMAGE POSTS

FIELD

The present invention relates generally to social media and, more particularly, to apparatuses and methods for aggregating duplicate posts of images on social media platforms.

BACKGROUND

Due to the pervasiveness of social media and the ease with which users are able to upload images, users are increasingly finding situations where duplicate photos have been uploaded to a social media platform by two different users. Existing methods for detecting duplicate photos are computationally expensive and not scalable to multi-uses scenarios. Additionally, a social media participant may be concerned with "watering down" their image or losing social media interactions to one or more other users who have posted the same photo as the participant.

As an example, assume that Julie posts a photo on Facebook™ and "tags" her mother and father in the photo. A tag refers to a label that a user attaches to someone or something in the photo for the purpose of identification or to impart other information. For instance, a tag may comprise a first name or a nickname for a person depicted in the photo. Not realizing that Julie has posted the photo already, Julie's mother also posts the same photo and tags Julie. Julie's mother also tags Julie's father. Julie's father also posts and tags this photo, not realizing that his wife and his daughter have already posted the same photo. Julie and her parents have many shared friends who are now seeing this same photo showing up in their personal feeds three different times for the three separate posts. Each of the three identical photos is associated with a different set of social interactions such as comments and "likes". The "like" is a Facebook™ feature that allows users to show their support for specific content such as comments, photos, or posts, without having to post their own written comment. After a user "likes" something, their news feed is updated, letting their friends know what content they "like."

SUMMARY

The following summary is merely intended to be exemplary. The summary is not intended to limit the scope of the claims.

A computer-implemented method for detecting duplicate images on a social media platform, in one aspect, may comprise searching, by the computer, a social media platform to identify a set of duplicate images comprising at least a first image that was posted to the social media platform by a first user and a second image that was posted to the social media platform by a second user, wherein the second image is a duplicate of the first image; providing a notification, by the computer, to at least one of the first user or the second user indicating that the set of duplicate images exists; selecting a host, by the computer, for a single consolidated image of the set of duplicate images; the computer using the first image or the second image, or both the first image and the second image, to provide the single consolidated image; and the computer consolidating one or more social media interactions associated with the first image with one or more social media interactions associated with the second image to generate a single set of social media interactions for the single consolidated image.

A computer program product for detecting duplicate images on a social media platform, in another aspect, may comprise a computer-readable storage medium having a computer-readable program stored therein, wherein the computer-readable program, when executed on a computing device including at least one processor, causes the at least one processor to search a social media platform to identify a set of duplicate images comprising at least a first image that was posted to the social media platform by a first user and a second image that was posted to the social media platform by a second user, wherein the second image is a duplicate of the first image; provide a notification to at least one of the first user or the second user indicating that the set of duplicate images exists; select a host for a single consolidated image of the set of duplicate images; use the first image or the second image, or both the first image and the second image, to provide the single consolidated image; and consolidate one or more social media interactions associated with the first image with one or more social media interactions associated with the second image to generate a single set of social media interactions for the single consolidated image.

An apparatus for detecting duplicate images on a social media platform, in another aspect, may comprise a computing device including at least one processor and a memory coupled to the at least one processor, wherein the memory comprises instructions which, when executed by the at least one processor, cause the at least one processor to search a social media platform to identify a set of duplicate images comprising at least a first image that was posted to the social media platform by a first user and a second image that was posted to the social media platform by a second user, wherein the second image is a duplicate of the first image; provide a notification to at least one of the first user or the second user indicating that the set of duplicate images exists; select a host for a single consolidated image of the set of duplicate images; use the first image or the second image, or both the first image and the second image, to provide the single consolidated image; and consolidate one or more social media interactions associated with the first image with one or more social media interactions associated with the second image to generate a single set of social media interactions for the single consolidated image.

BRIEF DESCRIPTION OF THE SEVERAL VIEWS OF THE DRAWINGS

The foregoing aspects and other features are explained in the following description, taken in connection with the accompanying drawings, wherein.

DETAILED DESCRIPTION

Figure 1:
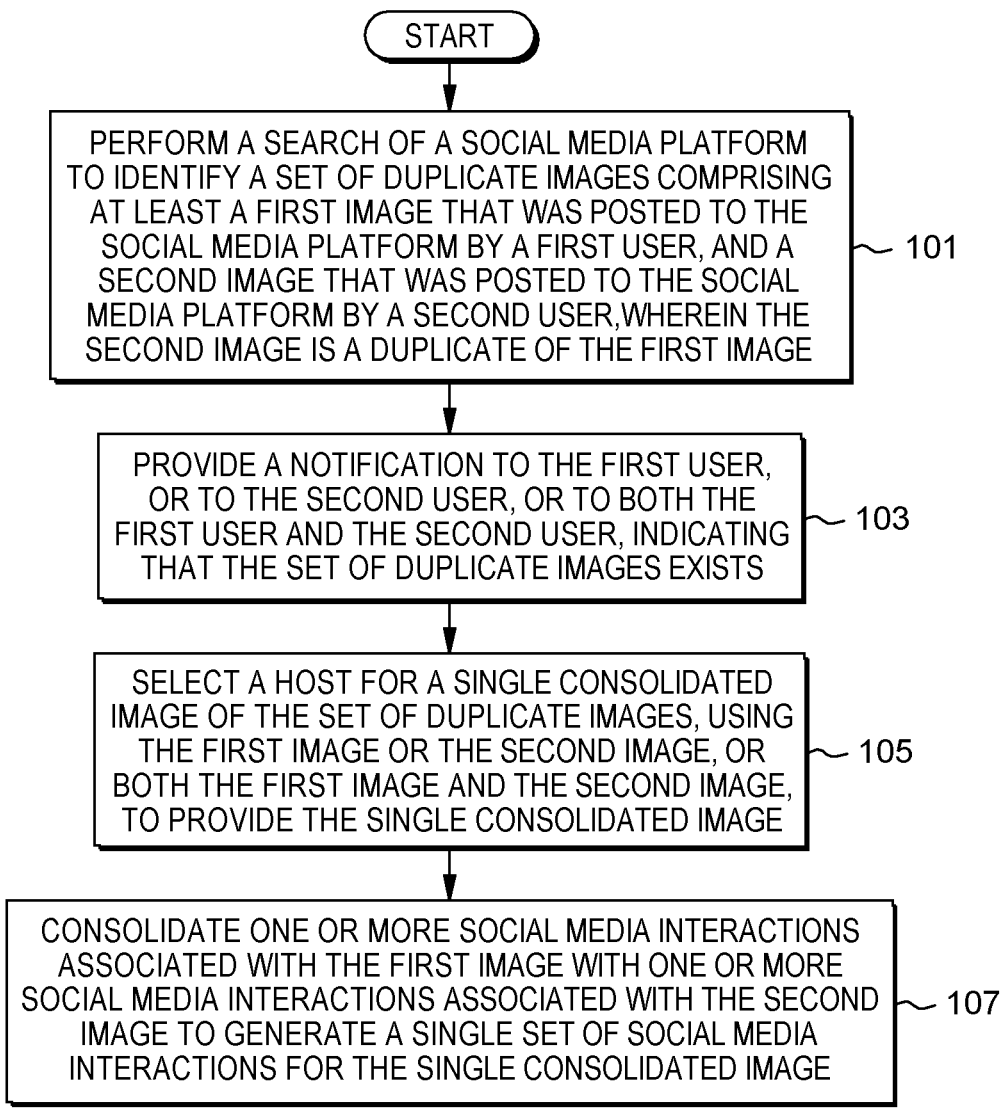
FIG. 1 illustrates an exemplary computer-executed method for detecting duplicate images on a social media platform in accordance with one or more embodiments of the invention.

As social websites and applications proliferate, social media platforms are becoming an integral part of life online. Social media platforms refer to a web-based collective of online communication channels dedicated to community-based input, interaction, content sharing, and collaboration. In business, social media platforms are used to market products, promote brands, connect to current customers, and foster new business. Social media platforms are websites and applications that generally fall into one or more categories comprising forums, microblogs, social networks, social bookmarks, social curation, and wikis. Some illustrative examples of social media platforms include Facebook™, Twitter™, Google+™, Wikipedia™, LinkedIn™, Reddit™, Snapchat™, Instagram™, Stumbleupon™, and Pinterest™.

Facebook™ is a free social networking website that allows registered users to create profiles, upload photos and video, send messages and keep in touch with friends, family and colleagues. According to statistics from the Nielsen Group, Internet users within the United States spend more time on Facebook™ than any other website. Twitter™ is a free microblogging service that allows registered members to broadcast short posts called tweets. Twitter members can broadcast tweets and follow other users' tweets by using multiple platforms and devices. Google+™ (pronounced Google plus) is Google's social networking project, designed to replicate the way people interact offline more closely than may be the case with other social networking services.

Pinterest™ is a social curation website for sharing and categorizing images found online. Pinterest™ requires brief descriptions but the main focus of the site is visual. Clicking on an image will take the viewer to the original source, so, for example, if the viewer clicks on a picture of a pair of shoes, the viewer might be taken to a site where the shoes can be purchased. An image of blueberry pancakes might take the viewer to a recipe for making the pictured pancakes. A picture of a whimsical birdhouse might take the viewer to a set of instructions for building the birdhouse.

Wikipedia™ is a free, open content online encyclopedia created through the collaborative effort of a community of users known as Wikipedians. Anyone registered on the site can create an article for publication; registration is not required to edit articles. LinkedIn™ is a social networking site designed specifically for the business community. The goal of the site is to allow registered members to establish and document networks of people they know and trust professionally. Reddit™ is a social news website and forum where stories are socially curated and promoted by site members. The site is composed of hundreds of sub-communities, known as "subreddits." Each subreddit has a specific topic such as technology, politics or music. Reddit™ site members, also known as, "redditors," submit content which is then voted upon by other members. The goal is to send well-regarded stories to the top of the site's main thread page.

Figure 2:
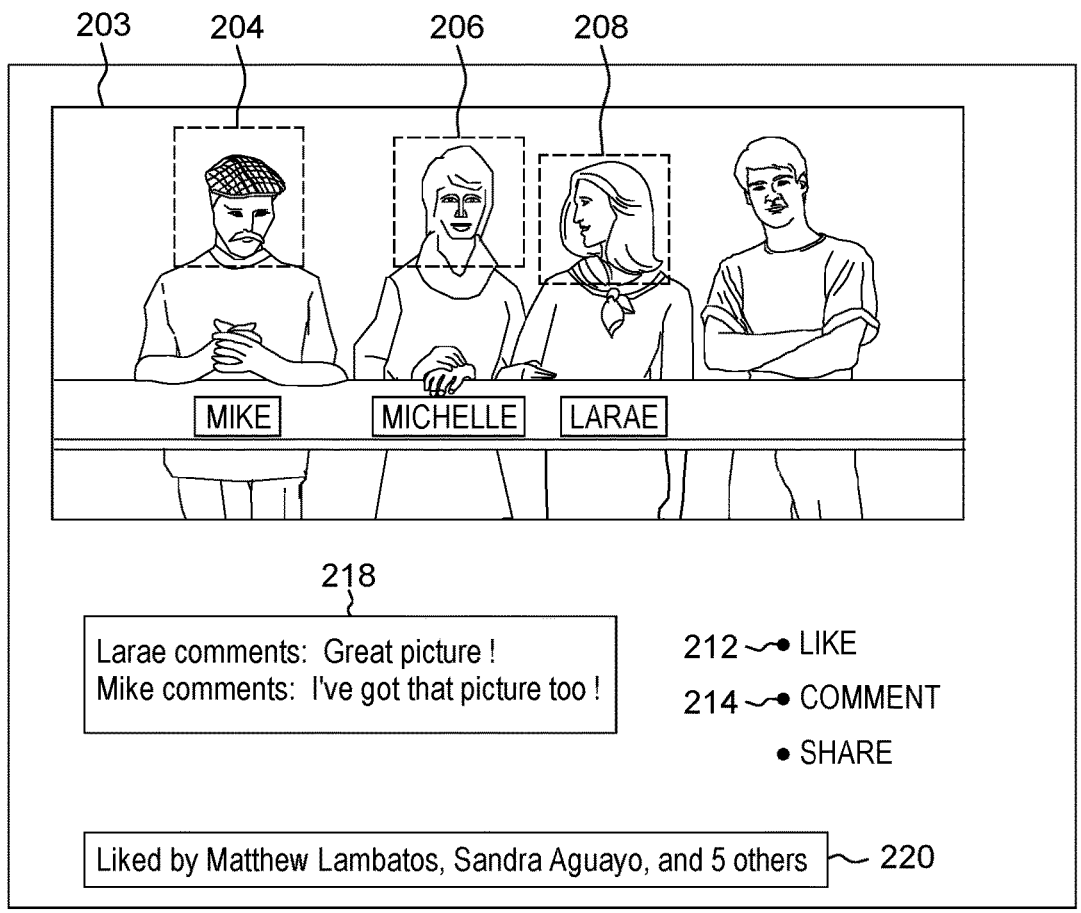
FIG. 2 illustrates an exemplary first image that has been posted to a social media platform by a first user.

FIG. 1 illustrates an exemplary computer executed method for detecting duplicate images on a social media platform in accordance with one or more embodiments of the invention. The method commences at block 101 where a social media platform is searched by the computer to identify a set of duplicate images comprising at least a first image that was posted to the social media platform by a first user and a second image that was posted to the social media platform by a second user, where the second image is a duplicate of the first image. Duplicate images refer to two or more images that are substantially identical, while disregarding any tags that have been added to any of the images by a user. For example, FIG. 2 illustrates an exemplary first image 203 that was posted to a social media platform by a first user named Michelle, and FIG. 3 illustrates an exemplary second image 303 that was posted to the social media platform by a second user named Dave.

Figure 3:
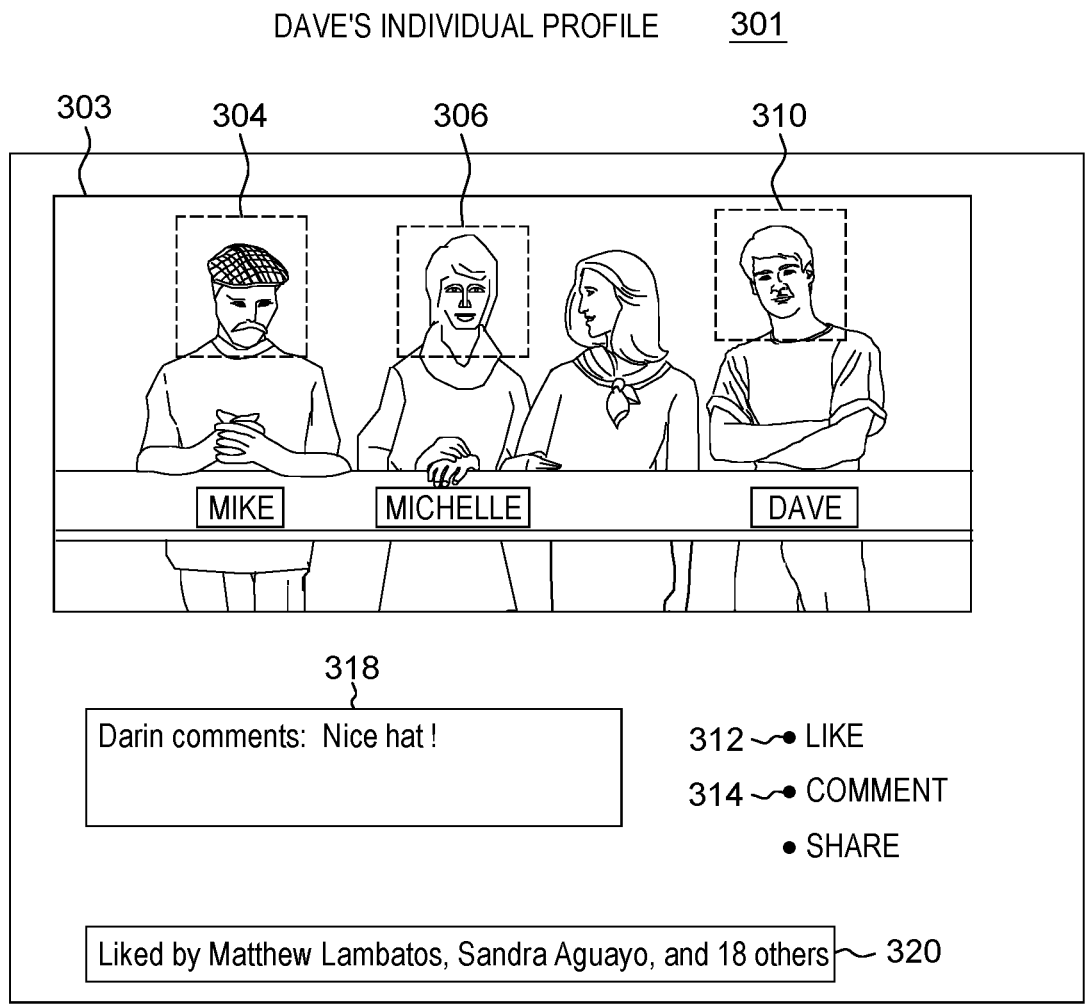
FIG. 3 illustrates an exemplary second image that has been posted to the social media platform by a second user.

With the exception of user-added tags, note that the first image 203 (FIG. 2) is a duplicate of the second image 303 (FIG. 3). A tag refers to a label that a user attaches to someone or something in the first image 203 (FIG. 2) or the second image 303 (FIG. 3) for the purpose of identification or to impart other information. A tag may comprise a first name or a nickname for a person depicted in the photo. For example, the first image 203 (FIG. 2) is a part of Michelle's individual profile 201 on a social media platform. Michelle has added to the first image 203 a first tag 204 identifying Mike, as well as a second tag 206 identifying Michelle, and a third tag 208 representing Larae. Likewise, the second image 303 (FIG. 3) is a part of Dave's individual profile 301 on the social media platform. Dave has added to the second image 303 a first tag 304 identifying Mike, a second tag 306 identifying Michelle, and a third tag 310 identifying Dave.

The step of identifying the set of duplicate images at block 101 (FIG. 1) may comprise the computer identifying a group of suspect duplicate images by analyzing at least one social media data similarity between the first image 203 (FIG. 2) and the second image 303 (FIG. 3). For example, the social media data similarity may comprise an individual, a group of individuals, an object, or a group of objects being associated with a tag in both the first image 203 (FIG. 2) and the second image 303 (FIG. 3), and wherein the tag comprises a label that a user attaches to the individual, the group of individuals, the object, or the group of objects, that identifies or describes the individual, the group of individuals, the object, or the group of objects.

According to the present example, the first image 203 (FIG. 2) and the second image 303 (FIG. 3) are placed into the group of suspect duplicate images by the computer in response to the data similarity comprising the individual, the group of individuals, the object, or the group of objects being tagged in both the first image 203 (FIG. 2) and the second image 303 (FIG. 3). For example, the first image 203 (FIG. 2) includes the first tag 204 identifying Mike and the second tag 206 identifying Michelle. The second image 303 (FIG. 3) also includes tags for Mike and Michelle. Mike is tagged using the first tag 304, and Michelle is tagged using the second tag 306. Therefore, the first image 203 (FIG. 2) and the second image 303 (FIG. 3) are placed into the group of suspect duplicate images by the computer. Then, a pixel-by-pixel comparison of all images in the group of suspect duplicate images comprising at least the first image 203 (FIG. 2) and the second image 303 (FIG. 3) may be conducted by the computer to determine whether or not any images in the group of suspect duplicate images are, in fact, duplicate images.

Alternatively or additionally, the social media data similarity may comprise one or more users associating a "like" indicator, a "thumbs-up" indicator, or another approval indicator with both the first image 203 (FIG. 2) and the second image 303 (FIG. 3). The "like" indicator is a feature on Facebook™ and some other social media platforms that allows users to show their support and approval for specific content such as comments, images, or posts, without having to post their own written comment. A user is able to indicate that they "like" an image by activating a like button associated with the image. For example, a like button 212 (FIG. 2) is associated with the first image 203, and a like button 312 (FIG. 3) is associated with the second image 303. The first image 203 (FIG. 2) is associated with a like field 220 that indicates a number or quantity of users who like the first image 203, and identifies one or more of these users. Likewise, the second image 303 (FIG. 3) is associated with a like field 320 that indicates a number or quantity of users who like the second image 303, and identifies one or more of these users. For example, the like field 220 (FIG. 2) indicates that Matthew Lambatos, Sandra Aguayo, and 5 other users like the first image 203. Similarly, the like field 320 (FIG. 3) indicates that Matthew Lambatos, Sandra Aguayo, and 18 other users like the second image 303. Therefore, in response to the same one or more users liking both the first image 203 (FIG. 2) and the second image 303 (FIG. 3), the first and second images are placed into the group of suspect images by the computer.

Alternatively or additionally, these data similarities may comprise the computer analyzing one or more user comments. For example, a user is able to add a comment to an image by activating a comment button associated with the image. For example, a comment button 214 (FIG. 2) is associated with the first image 203, and a comment button 314 (FIG. 3) is associated with the second image 303. The first image 203 (FIG. 2) is associated with a comment field 218 that includes any comments about the first image that have been added by one or more users. Likewise, the second image 303 (FIG. 3) is associated with a comment field 318 that includes any comments about the second image that have been added by one or more users. In the example of FIG. 2, Mike has commented "I've got that picture too!" In response to this comment, or any other comment suggesting that the commenter may have a duplicate image, the first image 203 (FIG. 2) and the second image 303 (FIG. 3) are placed into the group of suspect images by the computer.

After the group of suspect duplicate images are identified, a comparison procedure may be implemented by the computer to determine if any of the images in the group are the same. The comparison procedure may be performed on a pixel by pixel basis. The comparison procedure disregards any tagging that the user may have used to label elements in the image. In the foregoing example, this comparison procedure would determine that the first image 203 (FIG. 2) and the second image 303 (FIG. 3) are duplicate images.

Returning to FIG. 1, the operational sequence progresses to block 103 where a notification is provided by the computer to the first user, or to the second user, or to both the first user and the second user, indicating that the set of duplicate images exists. For example, a notification may be provided to Dave as follows: "Hello, Dave. We have found that you and Michelle have posted a duplicate photo." Alternatively or additionally, block 103 may comprise a functionality whereby a user can enable an expanded privacy setting or a sharing allowance for photos that are the same. For example, sharing can be enabled if the photo is an exact match on the user's network. Permissions may also include considerations on a content of the photo. For example, does the photo include minors, people, etc. A user may also be provided with the ability to opt in or opt out of the expanded privacy and/or sharing allowance settings.

Figure 4:
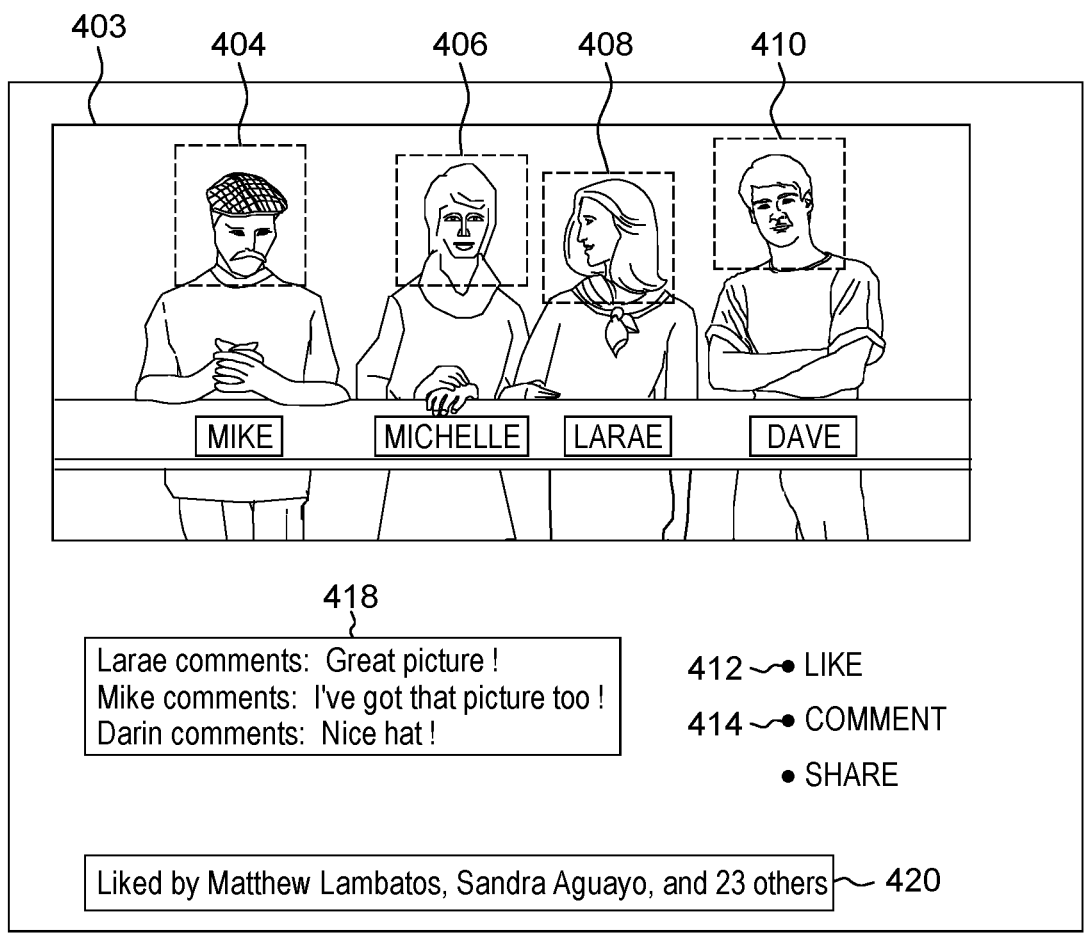
FIG. 4 illustrates an exemplary single consolidated image corresponding to the exemplary first and second images and generated in accordance with one or more embodiments of the invention.

Next at block 105, the computer selects a host for the single consolidated image of the set of duplicate images, using the first image or the second image, or both the first image and the second image, to provide the single consolidated image. FIG. 4 illustrates an exemplary single consolidated image 403 corresponding to the exemplary first image 203 (FIG. 2) and the exemplary second image 303 (FIG. 3), and generated in accordance with one or more embodiments of the invention. Assume that the first image 203 (FIG. 2) is stored on a first host, and the second image 303 (FIG. 3) is stored on a second host. Thus, if the first host is selected, the first image 203 (FIG. 2) is used to provide the single consolidated image 403 (FIG. 4). If the second host is selected, the second image 303 (FIG. 3) is used to provide the single consolidated image 403 (FIG. 4).

According to one set of embodiments, block 105 (FIG. 1) is performed by the computer prompting the first user or the second user, or both the first user and the second user, to decide upon a host for the single consolidated image 403 (FIG. 4). The prompt may be provided to Dave as follows: "Hello, Dave. We have found that you and Michelle have posted a duplicate photo. Would you like to share the photo with Michelle, have the photo on her profile, or have the photo on your profile?" A response to the prompt is received by the computer and used to determine the host for the single consolidated image 403 of the set of duplicate images. For example, if a response is received by the computer from Dave indicating that the photo is to be on Michelle's profile, then the host for the single consolidated image 403 is selected by the computer to be a first host on which the first image 203 (FIG. 2) is stored. On the other hand, if Dave indicates that the photo is to be on his profile, then the host for the single consolidated image 403 (FIG. 4) is selected by the computer to be a second host on which the second image 303 (FIG. 3) is stored.

According to another set of embodiments, if the computer detects a set of duplicate images between multiple (three or more) users, a review style process can be used by the computer to notify all of the users and request a decision as to which of the multiple users should host the photo after consolidation. Alternatively or additionally, a voting process can be implemented by the computer to notify all users of the existence of the set of duplicate images, and request each of the users to cast a vote for a proposed hosting user for a single consolidated image of the set of duplicate images. A proposed hosting user having a greatest number of votes is selected by the computer as the hosting user. In the event of a voting tie, the hosting user may be selected randomly by the computer.

According to another set of embodiments, block 105 (FIG. 1) is performed by the computer using a programmatic analysis approach. Pursuant to the programmatic analysis approach, the computer selects the single consolidated image 403 (FIG. 4) from the first image 203 (FIG. 2) and the second image 303 (FIG. 3), or the computer selects for removal a single image of the set of duplicate images comprising the first image 203 (FIG. 2) and the second image 303 (FIG. 3), or the computer brokers a sharing of the single consolidated image 403 (FIG. 4) between two or more users. A corresponding user profile is associated with each respective image of the set of duplicate images. The programmatic analysis approach may employ a cognitive evaluation by the computer that considers one or more image similarities between any image in the set of duplicate images and at least one additional image that is not in the set of duplicate images on each of a plurality of corresponding user profiles that are associated with the set of duplicate images. The one or more image similarities may comprise one or more identical tagged individuals, one or more identical tagged groups of individuals, one or more identical tagged objects, or one or more identical tagged groups of objects, or an identification of a similar scenery or a similar image background. The one or more image similarities may be identified using a pixel-by-pixel image analysis procedure.

Pursuant to the programmatic analysis approach, the computer can automatically select a host for the single consolidated image 403 (FIG. 4) from among the first host and the second host by the computer performing one or more of the following operations: (a) analyzing any comments associated with the first image 203 (FIG. 2) and the second image 303 (FIG. 3), selecting the first host for the single consolidated image 403 (FIG. 4) in response to the first image 203 (FIG. 2) being associated with a greatest number of comments than the second image 303 (FIG. 3), and selecting the second host for the single consolidated image 403 (FIG. 4) in response to the second image 303 (FIG. 3) being associated with an equal or greater number of comments than the first image 203 (FIG. 2); (b) comparing a first upload time for the first image 203 (FIG. 2) and a second upload time for the second image 303 (FIG. 3), selecting the first host for the single consolidated image 403 (FIG. 4) in response to the first image 203 (FIG. 2) being associated with a shorter upload time than the second image 303 (FIG. 3), and selecting the second host for the single consolidated image in response to the second image 303 (FIG. 3) being associated with an equal or shorter upload time than the first image 203 (FIG. 2); (c) comparing a total number of like indicators, thumbs-up indicators, or approval indicators for the first image 203 (FIG. 2) with a total number of like indicators, thumbs-up indicators, or approval indicators for the second image 303 (FIG. 3) selecting the first host for the single consolidated image 403 (FIG. 4) in response to the first image 203 (FIG. 2) being associated with a greater number of like indicators, thumbs-up indicators, or approval indicators than the second image 303 (FIG. 3), and selecting the second host for the single consolidated image 403 (FIG. 4) in response to the second image 303 (FIG. 3) being associated with an equal or greater number of like indicators, thumbs-up indicators, or approval indicators than the first image 203 (FIG. 2); (d) comparing a first context for the first image 203 (FIG. 2) to a second context for the second image 303 (FIG. 3) and selecting either the first host or the second host based upon the compared first and second contexts; (e) comparing a first content for the first image 203 (FIG. 2) to a second content for the second image 303 (FIG. 3) and selecting either the first host or the second host based upon the compared first and second contents; and (f) comparing a first set of individuals appearing in the first image 203 (FIG. 2) to a second set of individuals appearing in the second image 303 (FIG. 3) and selecting either the first host or the second host based upon the compared first and second sets of individuals.

Alternatively or additionally, the first host is associated with a first individual or entity, and the second host is associated with a second individual or entity. The computer selects a host for the single consolidated image 403 (FIG. 4) by comparing a first number of friends or connections associated with the first individual or entity with a second number of friends or connections associated with the second individual or entity. The first host is selected by the computer if the first number of friends or connections is greater than the second number of friends or connections. Otherwise, the second host is selected by the computer.

The operational sequence of FIG. 1 advances to block 107 where the computer consolidates one or more social media interactions associated with the first image 203 (FIG. 2) with one or more social media interactions associated with the second image 303 (FIG. 3) to generate a single set of social media interactions for the single consolidated image 403 (FIG. 4). For example, the comment field 218 (FIG. 2) of the first image 203 (FIG. 2) includes two comments, a first comment from Larae and a second comment from Mike. The comment field 318 (FIG. 3) of the second image 303 (FIG. 3) includes one comment from Darin. Thus, the computer combines the comments from the comment field 218 (FIG. 2) with the comments from the comment field 318 (FIG. 3) and places the combined comments into a comment field 418 (FIG. 4) for the single consolidated image 403. The comment field 418 includes the comments from Larae and Mike that are associated with the first image 203 (FIG. 2), as well as the comment from Darin that is associated with the second image 303 (FIG. 3). Alternatively or additionally, block 107 (FIG. 1) may include a functionality for the computer filtering and viewing comments from only one user or one user's network if it is not desired to view aggregated comments. Alternatively or additionally, block 107 may include an ability for the computer to receive a customization of associations parameter from a user, such that the computer will only perform aggregation of comments with close friends or family, in contrast to the computer performing aggregation of comments across all connections.

In addition to the computer consolidating the comment fields 218 (FIG. 2) and 318 (FIG. 3) at block 107 (FIG. 1), the computer also consolidates the like fields 220 (FIG. 2) and 320 (FIG. 3). The like field 220 (FIG. 2) indicates that the first image 203 is liked by Matthew Lambatos, Sandra Aguayo, and 5 other individuals. Meanwhile, the like field 320 (FIG. 3) indicates that the second image 303 is liked by Matthew Lambatos, Sandra Aguayo, and 18 other individuals. The likes from the like field 220 (FIG. 2) and the like field 320 (FIG. 3) are consolidated by the computer into a like field 420 (FIG. 4) for the single consolidated image 403. Thus, the like field 420 indicates that the consolidated image 403 is liked by Matthew Lambatos, Sandra Aguayo, and 23 other individuals. This example assumes that none of the 5 other individuals who liked the first image 203 (FIG. 2) are the same as the 18 other individuals who liked the second image 303 (FIG. 3).

In addition to consolidating the comment fields 218 (FIG. 2) and 318 (FIG. 3), and the like fields 220 (FIG. 2) and 320 (FIG. 3), the computer may consolidate any tags in the first image 203 (FIG. 2) and the second image 303 (FIG. 3). For example, recall that the first image 203 (FIG. 2) is a part of Michelle's individual profile 201 on the social media platform. Michelle has added to the first image 203 a first tag 204 identifying Mike, as well as a second tag 206 identifying Michelle, and a third tag 208 representing Larae. Likewise, the second image 303 (FIG. 3) is a part of Dave's individual profile 301 on the social media platform. Dave has added to the second image 303 a first tag 304 identifying Mike, a second tag 306 identifying Michelle, and a third tag 310 identifying Dave. Thus, the tags from the first image 203 are consolidated by the computer with the tags from the second image 303 to provide a consolidated image 403 (FIG. 4) with a first tag 404 identifying Mike, a second tag 406 identifying Michelle, a third tag 408 identifying Larae, and a fourth tag 410 identifying Dave.

Alternatively or additionally, block 107 (FIG. 1) may be performed by the computer only applying consolidation of comments and likes for shared contacts on a social media network to reduce feed redundancies. Consolidation would not be performed by the computer in situations where contacts for a given duplicate image are not shared.

Alternatively or additionally, rather than simply comparing user comments, image upload times, and user likes for an identified duplicate image, it is also possible for the computer to look at one or more additional images in albums from any individuals with the detected duplicate image. The one or more additional images can be compared by the computer to the duplicate images to identify an additional image of the one or more additional images that is most closely related to the duplicate image. Thus, a suggestion or prompt may be sent by the computer to two or more users with the same or similar images, with the prompt suggesting that these two or more users become friends.

The procedure of FIG. 1 provides an approach that capitalizes on expansive social media specific data, automatically notifies users of duplicate images, has the ability to automatically deal with duplicate images, and is able to automatically preserve and enhance the social media platform experience. Thus, the procedure of FIG. 1 improves and enhances the operation of the computer by providing the computer with a set of programming instructions to automatically handle duplicate images in a social or many-user environment without losing any of the social characteristics of the platform. This approach allows for a significantly relaxed method of automatically locating duplicate images compared to existing methods. Existing methods are not equipped to evaluate duplicate photos and hosting situations, nor do these existing methods consider compiling and consolidating the non-photo social media data such as likes and user comments.

Figure 5:
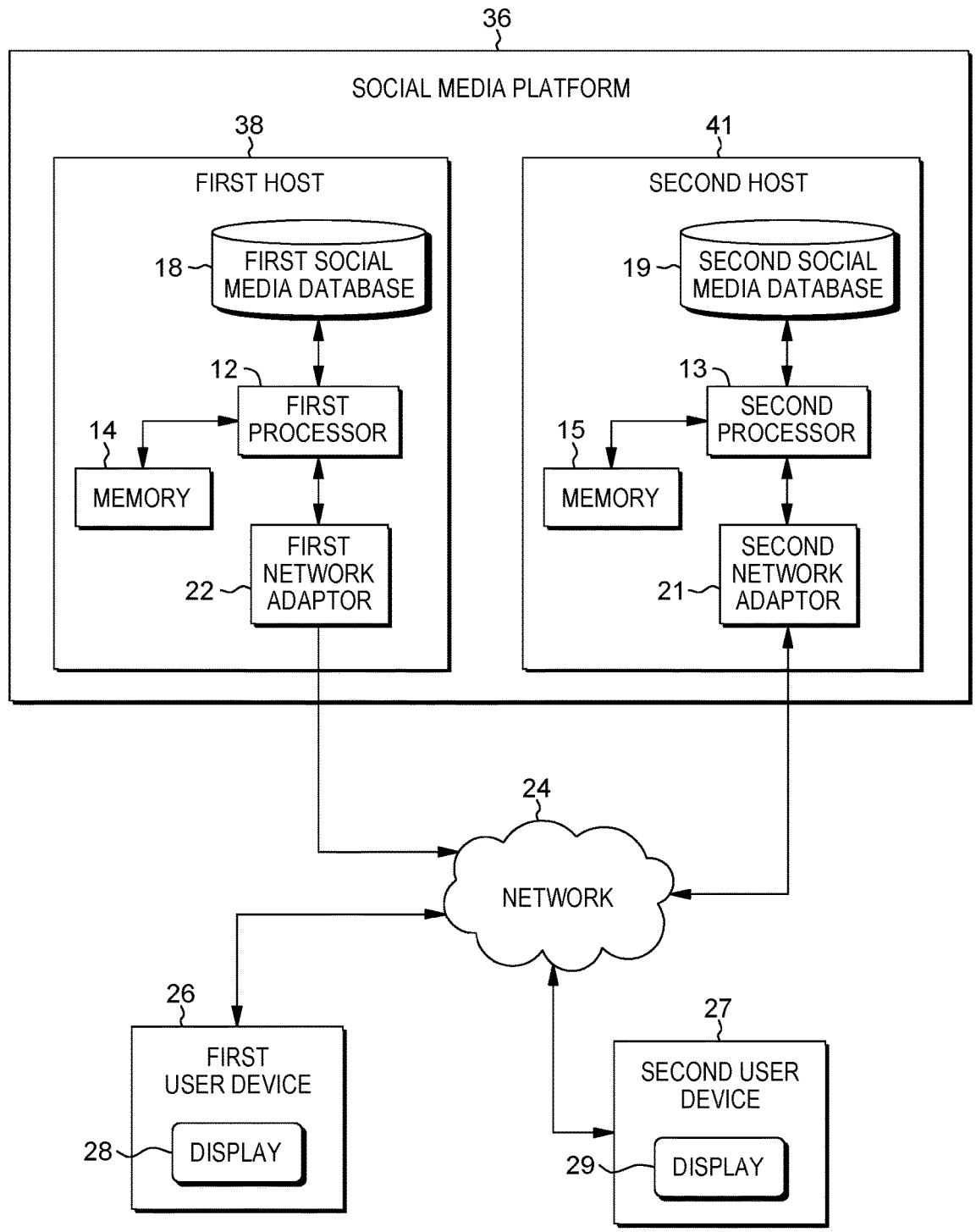
FIG. 5 illustrates an exemplary apparatus on which the method of FIG. 1 may be performed in accordance with one or more embodiments of the present invention.

FIG. 5 illustrates an exemplary computer system on which the method of FIG. 1 may be performed in accordance with one or more embodiments of the present invention. This computer system is only one example of a suitable processing system and is not intended to suggest any limitation as to the scope of use or functionality of embodiments of the methodology described herein. The processing system shown may be operational with numerous other general-purpose or special-purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, neural networks, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of the computer system may include, but are not limited to, a social media platform 36 operatively coupled to a network 24. The network 24 is configured for communicating with a first user device 26 and a second user device 27. The social media platform 36 includes a first host 38 and a second host 41. The first host 38 includes a first processor 12 operatively coupled to a first social media database 18, a first memory 14, and a first network adaptor 22. Likewise, the second host 41 includes a second processor 13 operatively coupled to a second social media database 19, a second memory 15, and a second network adaptor 21. The first and second processors 12 and 13 may each include a module that performs the methods described herein. The module may be programmed into the integrated circuits of the processors 12, 13, respectively, or loaded from memory 14, 15, respectively, or the network 24, or any of various combinations thereof. The first and second social media databases 18, 19 may each include any of a variety of computer system readable media. Such media may be any available media that is accessible by computer system, and it may include both volatile and non-volatile media, removable and non-removable media.

The first and second memories 14 and 15 can each include computer system readable media in the form of volatile memory, such as random access memory (RAM) and/or cache memory or others. The computer system may further include other removable/non-removable, volatile/non-volatile computer system storage media. By way of example only, the first and second social media databases 18 and 19 can each be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the processor 12, 13, respectively, over one or more data media interfaces.

The social media platform may also communicate with one or more external devices such as the first user device 26 or the second user device 27, or both, over the network 24. The first user device 26 and the second user device 27 may each include an input mechanism such as a keyboard, a pointing device, or a touch-sensitive display 28, etc.; one or more devices that enable a user to interact with the computer system; and/or any devices (e.g., network card, modem, etc.) that enable the computer system to communicate with one or more other computing devices; and a processing mechanism such as one or more microprocessors.

The network 24 can be a local area network (LAN), a general wide area network (WAN), and/or a public network (e.g., the Internet). The first processor 12 communicates over the network 24 via the first network adapter 22. The second processor 13 communicates over the network 24 via the second network adapter 21. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product for detecting duplicate images on a social media platform, the computer program product comprising a computer-readable storage medium having a computer-readable program stored therein, wherein the computer-readable program, when executed on a computing device including at least one processor, causes the at least one processor to:
   search a social media platform to identify a set of duplicate images comprising at least a first image that was posted by a first user to the social media platform by a first user and a second image that was posted by a second user to the social media platform by a second user, wherein the second image is a duplicate of the first image, the first image is stored on a first host device, and the second image is stored in a second host device;
   provide a notification to at least one of the first user or the second user indicating that the set of duplicate images exists;
   select a host device, among the first host device and the second host device, to host a single consolidated image of the set of duplicate images;
   execute an analysis that comprises:
     use an image, among the first image or the second image, that is stored in the selected host device to provide the single consolidated image;
     select a particular image for removal from the set of duplicate images comprising the first image and the second image; or
     broker a sharing of the single consolidated image between two or more users;
   consolidate one or more social media interactions associated with the first image with one or more social media interactions associated with the second image to generate a single set of social media interactions for the single consolidated image; and
   output the single consolidated image with the consolidated social media interactions on the social media platform.

2. The computer program product of claim 1 further configured for performing the search by analyzing at least one social media data similarity between the first image and the second image, the at least one social media data similarity comprising an individual, a group of individuals, an object, or a group of objects being associated with a tag in both the first image and the second image, and wherein the tag comprises a label that a user attaches to the individual, the group of individuals, the object, or the group of objects, that identifies or describes the individual, the group of individuals, the object, or the group of objects.

3. The computer program product of claim 1 further configured for performing the search by analyzing at least one social media data similarity between the first image and the second image, the at least one social media data similarity comprising or one or more users posting a like indicator, a thumbs-up indicator, or another approval indicator to both the first image and the second image.

4. The computer program product of claim 1 further configured, wherein the execution of the analysis comprises performing a programmatic analysis approach to automatically select the single consolidated image, to select the particular image for removal, or to broker the sharing of the single consolidated image between the two or more users.

5. The computer program product of claim 4 further configured for associating a corresponding user profile with each respective image of the set of duplicate images, and employing a cognitive evaluation that considers one or more image similarities between any image in the set of duplicate images and at least one additional image that is not in the set of duplicate images on each of a plurality of corresponding user profiles that are associated with the set of duplicate images.

6. The computer program product of claim 5 wherein the one or more image similarities comprise one or more identical tagged individuals, one or more identical tagged groups of individuals, one or more identical tagged objects, or one or more identical tagged groups of objects, or an identification of a similar scenery or a similar image background, and the one or more image similarities are identified using a pixel-by-pixel image analysis procedure.

7. The computer program product of claim 4 wherein the programmatic analysis approach automatically selects the host device for the single consolidated image by analyzing any comments associated with the first image and the second image, selecting the first host for the single consolidated image in response to the first image being associated with a greatest number of comments than the second image, and selecting the second host for the single consolidated image in response to the second image being associated with an equal or greater number of comments than the first image.

8. An apparatus for detecting duplicate images on a social media platform, the apparatus comprising at least one processor and a memory coupled to the at least one processor, wherein the memory comprises instructions which, when executed by the at least one processor, cause the at least one processor to:
   search a social media platform to identify a set of duplicate images comprising at least a first image that was posted by a first user to the social media platform and a second image that was posted by a second user to the social media platform, wherein the second image is a duplicate of the first image, the first image is stored on a first host device, and the second image is stored in a second host device;
   provide a notification to at least one of the first user or the second user indicating that the set of duplicate images exists;
   select a host device, among the first host device and the second host device, to host a single consolidated image of the set of duplicate images;
   execute an analysis that comprises:
     use an image, among the first image or the second image, that is stored in the selected host device to provide the single consolidated image;
     select a particular image for removal from the set of duplicate images comprising the first image and the second image; or broker a sharing of the single consolidated image between two or more users;

consolidate one or more social media interactions associated with the first image with one or more social media interactions associated with the second image to generate a single set of social media interactions for the single consolidated image; and output the single consolidated image with the consolidated social media interactions on the social media platform.

9. The apparatus of claim 8 further configured for performing the search by analyzing at least one social media data similarity between the first image and the second image, the at least one social media data similarity comprising an individual, a group of individuals, an object, or a group of objects being associated with a tag in both the first image and the second image, and wherein the tag comprises a label that a user attaches to the individual, the group of individuals, the object, or the group of objects, that identifies or describes the individual, the group of individuals, the object, or the group of objects.

10. The apparatus of claim 8 further configured for performing the search by analyzing at least one social media data similarity between the first image and the second image, the at least one social media data similarity comprising or one or more users posting a like indicator, a thumbs-up indicator, or another approval indicator to both the first image and the second image.

11. The apparatus of claim 8, wherein the execution of the analysis comprises performing a programmatic analysis approach to select the single consolidated image, to select the particular image for removal, or to broker the sharing of the single consolidated image between the two or more users.

* * * * *